(No Model.)
W. A. C. OAKS.
APPLE PARER AND CORER.
No. 397,871. Patented Feb. 12, 1889.
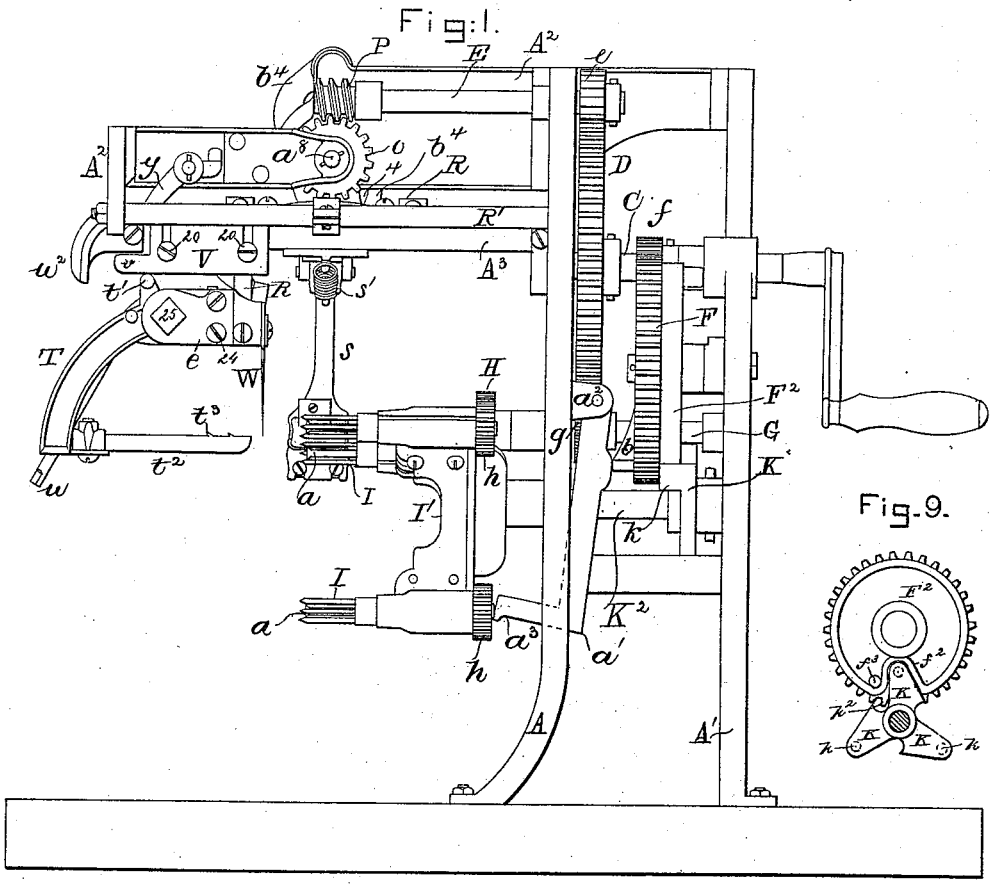
Witnesses:
Howard F. Eaton.
Frederick L. Emery.
Inventor.
William A. C. Oaks,
by Crosby & Gregory
Attys.

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

APPLE PARER AND CORER.

SPECIFICATION forming part of Letters Patent No. 397,871, dated February 12, 1889.

Application filed August 13, 1888. Serial No. 282,575. (No model.)

*To all whom it may concern:*

Be it known that I, WILLIAM A. C. OAKS, of Antrim, county of Hillsborough, State of New Hampshire, have invented an Improvement in Fruit or Apple Parers and Corers, of which the following description, in connection with the accompanying drawings, is a specification, like letters on the drawings representing like parts.

This invention has for its object to improve and simplify the apple-parer described in United States Patent No. 379,324, granted to me March 13, 1888, to which reference may be had. The knife-carriage described in the said patent is moved in one direction by a pinion engaging a rack on the said carriage, but the carriage has a quick return movement by or through a cam-shaped link acted upon by a pin carried by a crank.

One object of this invention is to do entirely away with the rack for moving the said carriage and actuate the latter in both directions of its traverse positively by means of a cam and cam-lever, the said cam and cam-lever being so shaped as to give a quick return movement to the knife-carriage, as will be described.

Another feature of this invention relates to the means employed for actuating the push-off rods locating at the center of the rotating forks. I have also made adjustable the plate for vibrating the arm carrying the corer.

My invention consists, essentially, in the combination, with a rotary fork for holding the fruit or apple to be pared and a knife and knife-carriage, of a cam and cam-lever to impart to the said carriage both its backward and forward motions, but at different rates of speed, substantially as will be described.

Other features of my invention will be further described in the specification and pointed out in the claims at the end of this specification.

Figure 1 in side elevation represents a sufficient portion of a fruit-paring machine to enable my invention to be understood; Fig. 2, a partial rear side view of the machine shown in Fig. 1; Fig. 3, a detail of the cam-wheel and the lever actuated by it to operate the push-off rods. Fig. 4 is a detail of part of the frame-work and knife-carrying carriage and the devices for lifting the paring-knife while the apple is being applied. Fig. 5 is a side elevation of a paring-knife and turn-table to which its shank is pivoted. Fig. 6 is a plan view of Fig. 5. Fig. 7 is a detail of the rack-bar by which the turn-table is rotated. Fig. 8 is a detail showing the lower end of the knock-off lever, and Fig. 9 is a detail of the flanged gear-wheel and parts co-operating with it.

The frame-work A A' A² contains a shaft, C, having a pinion, $f$, and a spur-gear, D. The gear $f$ engages a spur-wheel, F, having at one side a notched or cam-shaped flange, F², and a pin, $f^3$, which co-operates with a three-pronged plate or cam, K, on a shaft, K², the said spur-wheel and its flange and pin producing an intermitting rotation of the shaft K² and the fork-carrying head I', the latter in practice having three forks, I, the shafts of which are extended through bearings in the said head and have attached to their rear ends like pinions, $h$, which in the step-by-step rotation of the head I' are brought successively in engagement with the fork-rotating pinion H at the end of a shaft, G, having fast on it a pinion, $g$, which is engaged by the spur-wheel D, thus rotating the shaft G. Each fork and fork-shaft and pinion $h$ has extended centrally through it a push-off rod, $a$, free to slide longitudinally therein and actuated in one direction by the act of pushing the fruit to be pared upon the tines of the fork.

The lever (marked $s$) carrying the knife for paring the fruit is pivoted by a horizontal pivot, 12, on a turn-table, 13, free to turn about a vertical pivot, 14, of the knife-carrying carriage R, and the knife-carrying lever has a heel, $s^2$, (see Fig. 5,) and is acted upon by a spring, $s'$. The turn-table has a series of gear-teeth, 15, which engage teeth 16 of a rack made at the rear edge of the stationary horizontal bar, A³, (see Fig. 7,) so that the turn-table is partially rotated in one and then in an opposite direction at each forward and backward movement, respectively, of the carriage R on its guide-rods R' R².

The slicer W is connected to the sliding knife-carriage, and the said carriage has pivoted on it the arm T, to which is attached the corer $t^2$, the arm T having a projection, $t'$, acted upon by the plate V, attached to the frame-work to keep the corer in horizontal position while the paring-knife is traveling about the fruit being pared and the corer is entering the fruit or apple just behind the slicer. The projection $u^2$ of the frame acts against the projection $t'$ and turns the lever T to withdraw the corer from the apple. The arm $y$ is pivoted to the frame-work and notched at its end to engage the tipping lever $y^5$, (see Fig. 4,) pivoted at $y^6$, and causes the broad end $y^7$ of the said lever to act against the projection $s^2$ of the shank of the paring-knife to turn the said lever and hold back the paring-knife-carrying lever while the fruit is being applied to the fork. The gear D engages and rotates the pinion $e$, fast on the shaft E, having a worm, P.

The parts so far described are all substantially as shown in my patent, No. 379,324, dated March 13, 1888, and need not be herein more fully described.

The worm P engages a worm-gear, O, fast on a short shaft, $a^8$, having fast to its opposite end a crank arm or cam, $b'$, having a pin, $b^2$, and a projection, 3, the said arm or cam in its rotation moving the cam-lever $b^4$. The cam-lever $b^4$ and arm $s$ are shown as in about the center of the paring movement. The lever $b^4$ is moved in the direction of the arrow 40, Fig. 2, (its paring movement,) first by the action of the projection 3 of the cam or crank $b'$ on the pin 4, the said projection continuing to so move the lever $b^4$ until the pin $b^2$ meets the said lever, as shown in Fig. 2, when the pin $b^2$, acting against the curved inner side of the lever $b^4$, completes the paring movement, such movement being completed as the pin $b^2$ arrives at the point 42. As soon as the pin $b^2$ reaches the point 43, it commences to reverse the movement of the lever $b^4$ and carriage R, moving the same very rapidly, or at a faster speed until the pin $b^2$ passes the high point 5, at which instant the projection 3 catches the pin 4. The cam-lever $b^4$, having the irregular cam-slot and moved positively but at different speeds as it is moved in one and then in the opposite direction, is connected by link 7 to a portion of the knife-carriage. In this way and by the devices described both movements of the carriage are derived from the arm or cam $b'$ and the cam-lever $b^4$, and the return movement of the knife-carriage is made very quick as compared with the paring movement of the carriage.

The plate V is connected to the frame-work by screws 20 in slots in the said plate, so that the said plate is made adjustable to compensate for wear between it and the projection $t'$, and thus avoid any tendency of the corer to run up or down.

The push-off rods during the rotation of the head I carrying the forks are brought in succession opposite the lower inclined face, 22, of a wedge, $a^3$, at the lower end of a lever, $a'$, pivoted at $a^2$, and acted upon by a cam projection, $b^x$, carried at the side of the gear-wheel F, the said lever $a'$ being acted upon by the said cam $b^x$ to move the said lever and cause it to hasten the action of the push-off rods at the proper times. I have also provided the carriage with an adjustable clamping-plate, $e$, preferably a steel plate, attached to the carriage by screws 24, the free end of the plate being interposed between the head of the bolt 25 and the hub of the arm T, the said bolt serving as the fulcrum for the said arm.

Tightening the bolt 25 compensates for any wear of the hub of the arm T, for if the hub wears and is not held steadily the corer is liable to be diverted laterally from its straight course and will hit the fork or split the fruit.

I claim—

1. In a fruit-parer, a fork, a paring-knife, and knife-carriage, combined with the pivoted slotted cam-lever $b^4$ and a link, means to connect it with the knife-carriage, and with an arm or cam, $b'$, having a projection to act on the said cam-lever to move the knife-carriage positively in both directions of its movement, the return movement being the faster, substantially as described.

2. The rotating fork and the push-off rod therein, combined with the lever $a'$, having an inclined surface, as $a^3$, adapted to come into contact with the end of the push-off rod, and a cam to move the said lever and hasten the action of the rod, substantially as described.

In testimony whereof I have signed my name to this specification in the presence of two subscribing witnesses.

WILLIAM A. C. OAKS.

Witnesses:
H. A. HURLIN,
C. S. ABBOTT.